US008452481B2

(12) United States Patent
Ishiko et al.

(10) Patent No.: US 8,452,481 B2
(45) Date of Patent: May 28, 2013

(54) VEHICLE INFORMATION RECORDING APPARATUS, VEHICLE INFORMATION COMMUNICATION SYSTEM AND VEHICLE INFORMATION COMMUNICATION METHOD

(75) Inventors: Shinichi Ishiko, Yokkaichi (JP); Toshiya Hisada, Osaka (JP)

(73) Assignees: Autonetworks Technologies, Ltd., Mie (JP); Sumitomo Wiring Systems, Ltd., Mie (JP); Sumitomo Electric Industries, Ltd., Osaka (JP)

( * ) Notice: Subject to any disclaimer, the term of this patent is extended or adjusted under 35 U.S.C. 154(b) by 375 days.

(21) Appl. No.: 12/919,154

(22) PCT Filed: Mar. 2, 2009

(86) PCT No.: PCT/JP2009/053896
§ 371 (c)(1),
(2), (4) Date: Aug. 24, 2010

(87) PCT Pub. No.: WO2009/107836
PCT Pub. Date: Sep. 3, 2009

(65) Prior Publication Data
US 2010/0332072 A1  Dec. 30, 2010

(30) Foreign Application Priority Data

Feb. 29, 2008  (JP) .................................. 2008-050966

(51) Int. Cl.
*G06F 7/00*  (2006.01)
(52) U.S. Cl.
USPC ....................................... 701/30.4; 701/33.4

(58) Field of Classification Search
USPC .......................... 701/30, 33, 35; 340/438, 488
See application file for complete search history.

(56) References Cited

U.S. PATENT DOCUMENTS

| 2002/0161495 | A1* | 10/2002 | Yamaki ............................ 701/33 |
| 2007/0083304 | A1  | 4/2007  | Yamada |
| 2007/0202857 | A1  | 8/2007  | Hara |
| 2007/0299575 | A1* | 12/2007 | Yamada et al. ................. 701/29 |
| 2010/0292891 | A1* | 11/2010 | Morozumi ...................... 701/35 |

FOREIGN PATENT DOCUMENTS

| JP | A-2002-109690 | 4/2002 |
| JP | A-2002-322940 | 11/2002 |
| JP | A-2003-022330 | 1/2003 |
| JP | A-2005-146905 | 6/2005 |

(Continued)

OTHER PUBLICATIONS

International Search Report in International Application No. PCT/JP2009/053896; dated May 19, 2009 (with English-language translation).

(Continued)

*Primary Examiner* — Mary Cheung
*Assistant Examiner* — Brian P Sweeney
(74) *Attorney, Agent, or Firm* — Oliff & Berridge, PLC

(57) ABSTRACT

A GW device for relaying data sent and received between a plurality of ECUs mounted in a vehicle stores data sent from the respective ECUs in a database and then timely sends the data. The database is stored in a time series in association with time information, and copies of database at a plurality of time points are sent to a central device at predetermined time intervals, or at the time of detection of occurrence of a problem.

22 Claims, 9 Drawing Sheets

FOREIGN PATENT DOCUMENTS

| | | |
|---|---|---|
| JP | A-2005-308395 | 11/2005 |
| JP | A-2006-192967 | 7/2006 |
| JP | A-2007-099145 | 4/2007 |
| JP | A-2007-213114 | 8/2007 |
| JP | A-2007-251828 | 9/2007 |
| JP | A-2008-001233 | 1/2008 |

OTHER PUBLICATIONS

Japanese Office Action issued in Japanese Application No. 2010-500798 dated Aug. 7, 2012 (w/translation).

* cited by examiner

VEHICLE INFORMATION RECORDING APPARATUS, VEHICLE INFORMATION COMMUNICATION SYSTEM AND VEHICLE INFORMATION COMMUNICATION METHOD

TECHNICAL FIELD

The present invention relates to a vehicle information communication system which enables vehicle information to be grasped from an external device. The present invention relates more particularly to a vehicle information recording apparatus which makes it possible to improve the performance of reproducing the condition of an entire vehicle at the time of occurrence of a problem, instead of limiting to information about a specific vehicle-mounted device, and efficiently deal with the problem, and relates to a vehicle information communication system and a vehicle information communication method using the vehicle information recording apparatus.

BACKGROUND ART

There have been proposed various problem diagnosis systems which include a communication device in a vehicle to enable sending and receiving of information to/from external devices, inform a user of the occurrence of a problem when the problem occurs and send information concerning the problem to an external device, and allow grasping of the problem of the vehicle from outside by using a terminal device located in a dealership, a service station etc.

A vehicle includes a number of vehicle-mounted devices using ECUs (Electronic Control Units) for performing various control operations for a power train system, a safety control system, a body system etc. When a problem occurs, information including data retained in the ECUs or data outputted from the ECUs is useful to investigate the cause of the problem.

Patent Document 1 discloses a vehicle management system which self-diagnoses a fuel system, wirelessly sends real-time diagnosis information indicating the result of the self-diagnosis to an external device, and accumulates the diagnosis information in a database in the external device in order to enable analyzing the condition of the fuel system in the future.

Patent document 2 discloses a remote maintenance apparatus which sends vehicle driving information and positional information obtained from specific sensors to a call center to allow the call center to determine the symptoms of a problem and the necessity of taking emergency measures based on the vehicle driving information and make an appointment with a service station automatically, and is thereby capable of eliminating the time-consuming work for the user.

Patent Document 3 discloses a vehicle condition monitor system which, when problem information is detected in a section subjected to a problem diagnosis, obtains problem history information corresponding to the problem information from an external device, thereby making it possible to accurately grasping the problem and a problem occurrence tendency by analysis of the problem history information.

Patent Document 4 discloses a remote control system which realizes wireless remote control by wirelessly sending vehicle information including the result of control performed by a vehicle-mounted device in response to a request for remote control to an external device.

Patent Document 5 discloses a diagnosis system which sends information about the connection status of a vehicle-mounted network to an external device, thereby allowing the external device to diagnose the propriety of the connection status of the vehicle-mounted network.

Patent Document 6 discloses a vehicle maintenance system including a terminal device used by a user, a terminal device mounted in a vehicle, a dealer terminal device used by a dealer, and a server apparatus for controlling sending and receiving of data between the respective terminal devices, thereby enabling sending and receiving of maintenance information between the respective devices.

Patent Document 1: Japanese Patent Application Laid-Open No. 2002-322940
Patent Document 2: Japanese Patent Application Laid-Open No. 2002-109690
Patent Document 3: Japanese Patent Application Laid-Open No. 2005-146905
Patent Document 4: Japanese Patent Application Laid-Open No. 2006-192967
Patent Document 5: Japanese Patent Application Laid-Open No. 2007-99145
Patent Document 6: Japanese Patent Application Laid-Open No. 2007-213114

DISCLOSURE OF INVENTION

Problems to be Solved by the Invention

With the techniques disclosed in Patent Documents 1 to 6, it is possible to grasp problem information, such as temporary measured values and control values in specific sensors and an actuator at a time point when a problem occurred and time points before and after this time point, from an external device.

However, ECUs mounted in recent vehicles realize complex and high-performance functions by interactive processes with a number of ECUs. Therefore, there is a possibility that the cause of a problem in a vehicle is not determined by only specific information about a specific ECU because information about control values in ECUs which are operating normally even when the problem occurred are sometimes required. The techniques disclosed in Patent Documents 1 to 6 do not suppose to send information about the entire vehicle including information other than information about the occurrence of a problem. Moreover, in the conventional configurations, it is difficult to obtain the information about each of the ECUs at a certain time point at the same time.

The present invention has been made with the aim of solving the above problems, and it is an object of the invention to provide a vehicle information recording apparatus with a structure which collects information from a plurality of ECUs in a centralized manner and stores data at respective time points in a time series so that the information is obtainable from an external device, and enables reproduction of the condition of an entire vehicle by using part or all the information when diagnosing a problem or at the time of periodic diagnosis, and thereby making it possible to efficiently deal with problems, and to provide a vehicle information communication system and a vehicle information communication method using the vehicle information recording apparatus.

Means for Solving the Problems

A vehicle information recording apparatus according to a first aspect of the invention is a vehicle information recording apparatus for recording data from a plurality of devices mounted in a vehicle, the vehicle information recording apparatus being connected to a plurality of communication lines to which the devices mounted in the vehicle are connected respectively, and comprising means for receiving part or all of data repeatedly sent from the respective devices to the plurality of communication lines and recording the data in a database, and means for sending the data recorded in the database on a request from each of the devices, the vehicle information recording apparatus comprising: means for updating the database every time data is received; storage means for storing part or all of the data recorded in the database into a storage area different from an area for the database in a time series; obtaining means for obtaining time information every time the storage means stores data in the storage area; means for storing the time information obtained by the obtaining means in association with the data and sending means for sending the data and time information stored in the storage area to an external device.

A vehicle information recording apparatus according to a second aspect of the invention is characterized by further comprising: detecting means for detecting occurrence of a problem in the vehicle; and means for storing problem information indicating a symptom of the problem, wherein when the detecting means detects occurrence of a problem, the data stored in a time series in the storage area and the problem information are sent to an external device.

A vehicle information recording apparatus according to a third aspect of the invention is characterized in that the detecting means detects occurrence of a problem based on received data, and when the detecting means detects occurrence of a problem, the problem information is associated with the data stored in the storage area.

A vehicle information recording apparatus according to a fourth aspect of the invention is characterized in that storing of data in the storage area continues after the detecting means detects occurrence of a problem, and the sending means sends the data stored in the storage area until a predetermined time has passed after the detecting means detected the occurrence of the problem, and the problem information to an external device.

A vehicle information recording apparatus according to a fifth aspect of the invention is characterized by further comprising means for accepting a send request from an external device, wherein, when the means accepts a send request, the sending means sends the data and time information stored in the storage area.

A vehicle information recording apparatus according to a sixth aspect of the invention is characterized in that the sending means sends the data and time information at predetermined intervals.

A vehicle information recording apparatus according to a seventh aspect of the invention is characterized in that the sending means wirelessly sends the data and time information.

A vehicle information recording apparatus according to an eighth aspect of the invention is characterized by being connected to the plurality of devices through the plurality of communication lines for different communication speeds.

A vehicle information communication system according to a ninth aspect of the invention is a vehicle information communication system comprising: a plurality of the vehicle information recording apparatuses of any one of the first to eighth aspects of the invention; and an information processing apparatus capable of wirelessly communicating with the vehicle information recording apparatuses, wherein the information processing apparatus comprises: means for receiving data and time information sent from the vehicle information recording apparatuses; and means for storing the received data and time information for each vehicle.

A vehicle information communication system according to a tenth aspect of the invention is based on the ninth aspect of the invention, and is characterized in that the information processing apparatus further comprises determining means for determining, based on the data and time information stored for each vehicle, whether or not a vehicle needs maintenance by comparing the data indicating condition of the vehicle at respective time points, or a change in the data with time, with predetermined abnormality condition.

A vehicle information communication system according to an eleventh aspect of the invention is based on the tenth aspect of the invention, and is characterized in that the information processing apparatus is connected through a communication network to a plurality of terminal devices located in shops for selling a vehicle or providing an inspection and maintenance service, and the information processing apparatus further comprises: means for storing, for each vehicle, identification information about the vehicle and shop information in association with each other; means for specifying shop information based on the identification information about the vehicle; and means for, when the determining means determines that one vehicle needs maintenance, specifying shop information from the identification information about the one vehicle and reporting the need of maintenance for the one vehicle to the terminal device located in the shop indicated by the shop information.

A vehicle information communication system according to a twelfth aspect of the invention is based on the eleventh aspect of the invention, and is characterized in that each of the terminal devices comprises: means for obtaining data and time information for each vehicle stored in the information processing apparatus; and means for outputting the obtained data and time information.

A vehicle information communication method according to a thirteenth aspect of the invention is a vehicle information communication method, with a vehicle information recording apparatus connected to a plurality of communication lines to which a plurality of devices mounted in a vehicle are connected respectively, for receiving part or all of data repeatedly sent from the respective devices and recording the received data in a database, the method for sending the data recorded in the database on a request from each of the devices, and sending the data from each of the devices mounted in the vehicle, which is recorded in the database, to an external device, the method comprising: the vehicle information recording apparatus updating the database every time data is received; the vehicle information recording apparatus storing part or all of the data recorded in the database into a storage area different from an area for the database in a time series; the vehicle information recording apparatus obtaining time information every time data is stored in the storage area; the vehicle information recording apparatus storing the obtained time information in association with the data; and the vehicle information recording apparatus sending the data and time information stored in the storage area to an external device.

A vehicle information communication method according to a fourteenth aspect of the invention is a vehicle information communication method for communicating vehicle information among a vehicle information recording apparatus connected to a plurality of communication lines to which a plurality of devices mounted in a vehicle are connected respectively, for receiving part or all of data repeatedly sent from the respective devices, recording the received data in a database, sending the data recorded in the database to each device on a request from the device and recording vehicle information, an information processing apparatus capable of communicating with the vehicle information recording apparatus of each vehicle, and a plurality of terminal devices connected to the information processing apparatus through a communication network, wherein the plurality of terminal devices are located in shops for selling a vehicle or providing an inspection and maintenance service, the vehicle information recording apparatus updating the database every time data is received; the vehicle information recording apparatus storing part or all of the data recorded in the database into a storage area different from an area for the database in a time series; the vehicle information recording apparatus obtaining time information every time data is stored in the storage area; the vehicle information recording apparatus storing the obtained time information in association with the data; the vehicle information recording apparatus sending the data and time information stored in the storage area to the information processing apparatus; the information processing apparatus storing, for each vehicle, identification information about the vehicle and shop information in association with each other; the information processing apparatus receiving the data and time information sent from the vehicle information recording apparatus; the information processing apparatus storing the received data and time information for each vehicle; the information processing apparatus determining, based on the data and time information stored for each vehicle, whether or not a vehicle needs maintenance by comparing the data indicating condition of the vehicle at respective time points, or a change in the data with time, with predetermined abnormality condition; the information processing apparatus, when determined that one vehicle needs maintenance, specifying shop information from the identification information about the one vehicle; and the information processing apparatus reporting the need of maintenance for the one vehicle to the terminal device located in the shop indicated by the shop information.

In the first, ninth and thirteenth aspects of the invention, all the data sent from each of the devices (ECUs) mounted in a vehicle is recorded in the database, and the data recorded in the database is timely sent so that the data is relayed between the respective devices and the database is updated every time new data is received. Part or all of the data recorded in the database is stored in the storage area in a time series, and time information is stored at the same time in association with the data. In other words, information indicating the condition of the entire vehicle at each time point is stored. The data and time information stored in the storage area are sent to an external device and obtainable from an external device. It is possible to reproduce the condition of the vehicle with reference of the respective data and time information stored for the respective vehicles when periodically diagnosing the condition of the vehicle, or when a problem occurs. In this case, the data and time information are sent from the vehicle information recording apparatus irrespective of occurrence of a problem.

In the second aspect of the invention, when the detecting means detects occurrence of a problem, part or all of the database where data sent from the respective ECUs is recorded is stored in a time series and sent, and therefore information indicating the condition of the entire vehicle at the time of the occurrence of the problem is obtainable from an external device, and the condition of the vehicle at the time of the occurrence of the problem is reproducible.

In the third aspect of the invention, when the detecting means detects occurrence of a problem, since data based on which the occurrence of a problem is detected and problem information indicating the symptoms of the problem are associated with each other, the cause of the problem is quickly investigated.

In the fourth aspect of the invention, since data indicating not only the condition of the entire vehicle at the time of the detection of occurrence of a problem, but also the condition of the entire vehicle before and after the occurrence of the problem are stored and sent, the condition of the entire vehicle before and after the time of the occurrence of the problem is reproducible.

In the fifth aspect of the invention, when a send request from an external device is accepted, the stored information is sent. The information indicating the condition of the vehicle is obtainable from an external device not only at the time of occurrence of a problem, but also at an arbitrary timing, such as the periodic diagnosis timing. Thus, when a problem occurs in the future, it is possible to quickly deal with the problem.

In the sixth aspect of the invention, since the data sent from the respective ECUs is sent to an external device at predetermined intervals, such as at certain time intervals or every predetermined driving distance, it is possible to perform a periodic diagnosis irrespective of the occurrence of a problem. Moreover, when a problem occurs in the future, it is possible to compare the condition of the vehicle with information indicating the normal condition of the vehicle, and thus the cause of the problem is quickly investigated.

In the seventh aspect of the invention, since the data and time information are wirelessly sent, before a user, who noticed the occurrence of a problem arrives at a dealership or a service station, the dealership or the service station grasps the condition of each vehicle and quickly deals with the problem.

In the eighth aspect of the invention, since data from different types of ECUs connected to communication lines for different communication speeds is also received and recorded, it is possible to reproduce the condition of the entire vehicle without limiting to the data from a specific ECU.

In the tenth and fourteenth aspects of the invention, in the information processing apparatus which receives and stores, for each vehicle, data and time information sent from the vehicle information recording apparatus of each vehicle, a determination as to whether or not a vehicle needs maintenance is made by comparing the stored data and time information with predetermined abnormal conditions. Since data indicating the condition of each vehicle at each time point is stored in the information processing apparatus, it is possible to search the condition of each vehicle at the respective time points in the past and makes a determination totally from the conditions at the respective time points and a change in the condition with time. Since the total condition of the entire vehicle is compared with abnormality conditions, it is possible to detect an abnormality of the vehicle that the owner of the vehicle has not noticed, or an omen which is detected before an abnormality is detected.

In the eleventh and fourteenth aspects of the invention, the information processing apparatus which receives and stores, for each vehicle, data and time information sent from the vehicle information recording apparatus of each vehicle is connected through a communication network to a plurality of terminal devices located in shops for selling a vehicle or providing an inspection and maintenance service. When the information processing apparatus determines that one vehicle needs maintenance, a shop is specified from the identification information about the one vehicle, and the terminal device of the shop is informed of the need of maintenance. It is thus possible to realize service in which an operator in the shop asks the owner of the vehicle to contact the shop.

In the twelfth aspect of the invention, a plurality of terminal devices located in the respective shops for selling a vehicle or providing an inspection and maintenance service are connected to the information processing apparatus through a communication network and are able to obtain data and time information stored in the information processing apparatus for each vehicle and output the data and information with the output device such as a display and a speaker. Thus, since the staff in the vehicle shop using the terminal device is able to grasp not only the condition of the vehicle at the time of an inspection, but also the past information, it is possible to detect more minute defects. Since the past condition of the vehicle is reproducible based on data indicating the conditions of the entire vehicle in the past, there is a higher possibility that the cause of a defect discovered at the time of inspection is quickly investigated.

Effects of the Invention

According to the present invention, with the structure capable of reproducing the condition of the entire vehicle at the time of occurrence of a problem and before and after this time by using part or all of information about the vehicle when making a problem diagnosis and a periodic diagnosis, the dealership or service stations are able to efficiently and quickly deal with problems of each vehicle.

Figure 1:
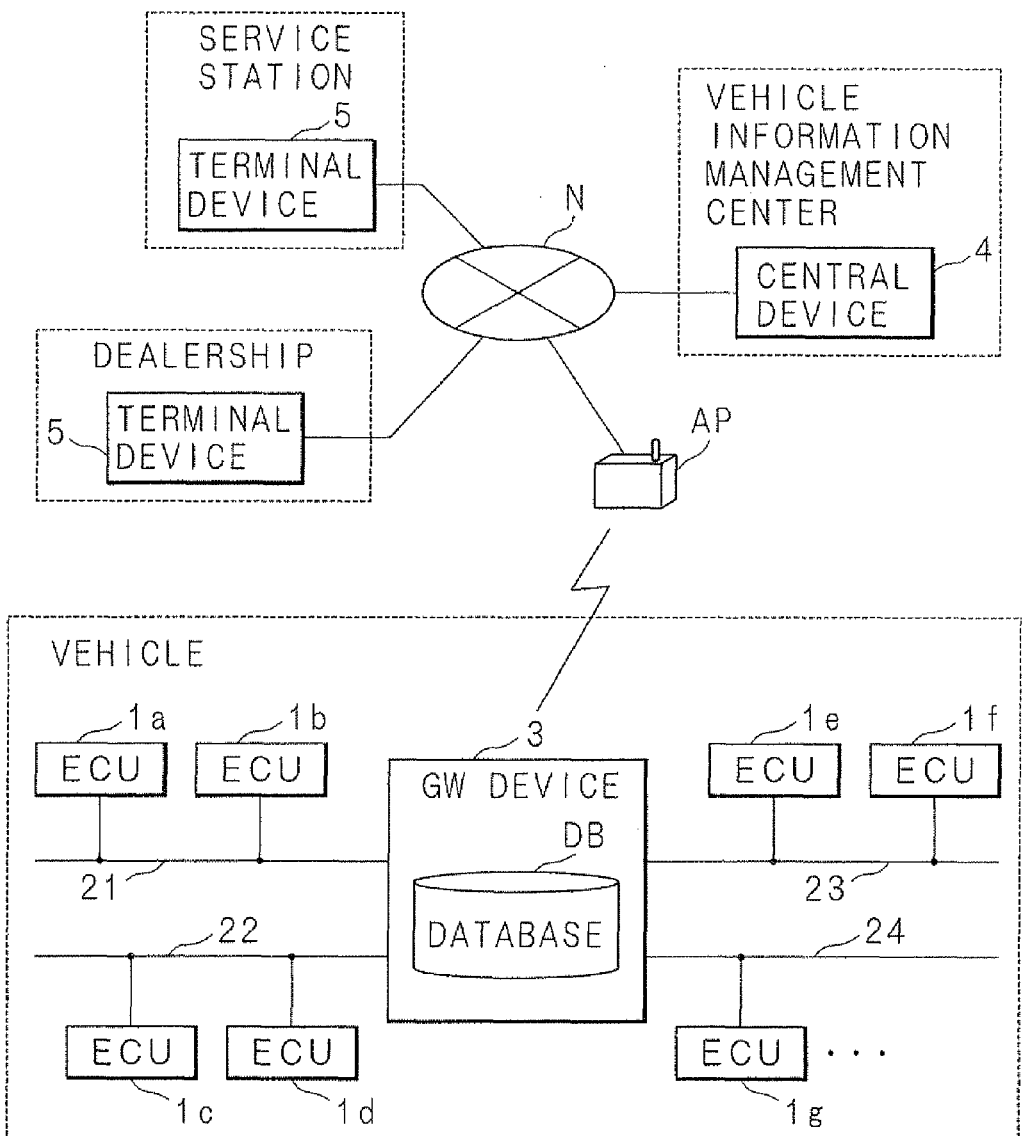
FIG. 1 is a block diagram illustrating the structure of a vehicle information communication system of Embodiment 1.

EXPLANATION OF REFERENCE NUMERALS 1a, 1b, 1c, 1d, 1e, if, 1g ECUs
21, 22, 23, 24 Communication lines
3 GW device
30 Control section
35 Storage section
DB Database
36 Temporary storage area
37 Memory retaining section
38 Wireless communication section
39 GPS receiving section
4 Central device
41 Storage section
43 Communication section

BEST MODE FOR CARRYING OUT THE INVENTION

The following description will specifically explain the present invention with reference to the drawings illustrating some embodiments thereof.

Embodiment 1

FIG. 1 is a block diagram illustrating the structure of a vehicle information communication system of Embodiment 1. The vehicle information communication system comprises: a plurality of ECUs $1a$, $1b$, $1c$, $1d$, $1e$, $1f$, $1g$, . . . mounted in a vehicle; communication lines 21, 22, 23, 24 for connecting the ECUs la, $1b$, $1c$, $1d$, $1e$, $1f$, $1g$, . . . ; a GW device 3 for relaying data between the ECUs $1a$, $1b$, $1c$, $1d$, $1e$, $1f$, $1g$, . . . ; and a central device 4 connected to GW devices 3, 3, . . . of vehicles via a network N, and further comprises terminal devices 5, 5, . . . connected to the central device 4 via the network N.

The ECUs $1a$, $1b$, $1c$, $1d$, $1e$, $1f$, $1g$ . . . are devices capable of controlling sending of data including numerical information about various physical amounts, such as measured values, calculated values and control values, or controlling an engine, a brake etc. with a microcomputer. The ECUs $1a$ and $1b$ are connected to the communication line 21, the ECUs $1c$ and $1d$ are connected to the communication line 22, the ECU $1e$ and $1f$ are connected to the communication line 23, and the ECU $1g$ is connected to the communication line 24. For example, the ECU $1a$ functions as an ABS (Antilock Brake System) and is connected to a sensor, not shown, for detecting the rotation speed of a wheel (wheel speed). The ECU $1a$ controls the brake based on the wheel speed detected through the sensor when braking the vehicle, and also sends the measured value of the wheel speed as data to the GW device 3 through the communication line 21.

The communication lines 21, 22, 23 and 24 realize communication at different speeds according to the types of data between the ECUs $1a$, $1b$, $1c$, $1d$, $1e$, $1f$, $1g$, . . . connected to the respective communication lines. For example, power train ECUs $1a$ and $1b$, such as the ECU $1a$ having the ABS function, are connected to the communication line 21 to enable communication according to high-speed CAN (Controller Area Network) protocol. Body ECUs $1c$ and $1d$ for opening and closing doors and windows are connected to the communication line 22 to enable communication according to low-speed CAN, or LIN (Local Interconnect Network) protocol. Safety control ECUs $1e$ and $1f$ are connected to the communication line 23 to enable high-speed communication according to the FlexRay (registered trademark) protocol. The ECU $1g$ for multimedia systems, such as an automotive navigation system and a television system, is connected to the communication line 23 to enable high-speed communication according to the high-speed CAN, MOST (Media Oriented Systems Transport), or IDB-1394 protocol.

Although the ECUs 1a, 1b, 1c, 1d, 1e, 1f, 1g, ... in FIG. 1 are connected to the communication lines 21, 22, 23 and 24 by a bus, the connection type is not limited to this, and the ECUs 1a, 1b, 1c, 1d, 1e, 1f, 1g, are connected according to the protocols for the respective communication lines 21, 22, 23 and 24.

The GW device 3 is connected to all the communication lines 21, 22, 23 and 24 for different communication speeds. The GW device 3 has a storage area for use as a database DB, and collects and records various types of data sent consecutively from the ECUs 1a, 1b, 1c, 1d, 1e, 1f, 1g, ... in the database DB in a centralized manner. Then, the GW device 3 retrieves data from the database DB according to a request from each of the ECUs 1a, 1b, 1c, 1d, 1e, 1f, 1g, ..., and sends the data to the ECUs 1a, 1b, 1c, 1d, 1e, 1f, 1g, ... which made the request. Thus, the GW device 3 functions as a relay device for relaying data between the ECUs 1a, 1b, 1c, 1d, 1e, 1f, 1g, ... connected to different communication lines 21, 22, 23 and 24, and also functions as a vehicle information recording apparatus which records all the data sent from the ECUs 1a, 1b, 1c, 1d, 1e, 1f, 1g, ... mounted in the vehicle in a centralized manner.

Moreover, the GW device 3 is capable of communicating with the central device 4 through an access point AP and the network N by wireless communication.

The central device 4 is mounted in a vehicle information management center, and automatically stores data sent from the GW devices 3, 3 ... of vehicles separately for each vehicle and automatically associates the owner information of each vehicle with the data. The central device 4 also stores information about dealerships which sell vehicles and provide inspection service etc., service stations which provide maintenance service for vehicles, and manufacturing companies of vehicles as a database so that the information is obtainable from an external device through the network N in addition to the data sent from the above-mentioned GW devices 3, 3, ... of the vehicles and the vehicles' owner information.

The terminal devices 5, 5 are located in dealerships, service stations etc. and able to communicate with the central device 4 through the network N. With the use of the terminal devices 5, 5 ..., the staff of dealerships or service stations is able to obtain various types of information from the central device 4 to browse the information, and input various types of information to store the information in the central device 4.

Figure 2:
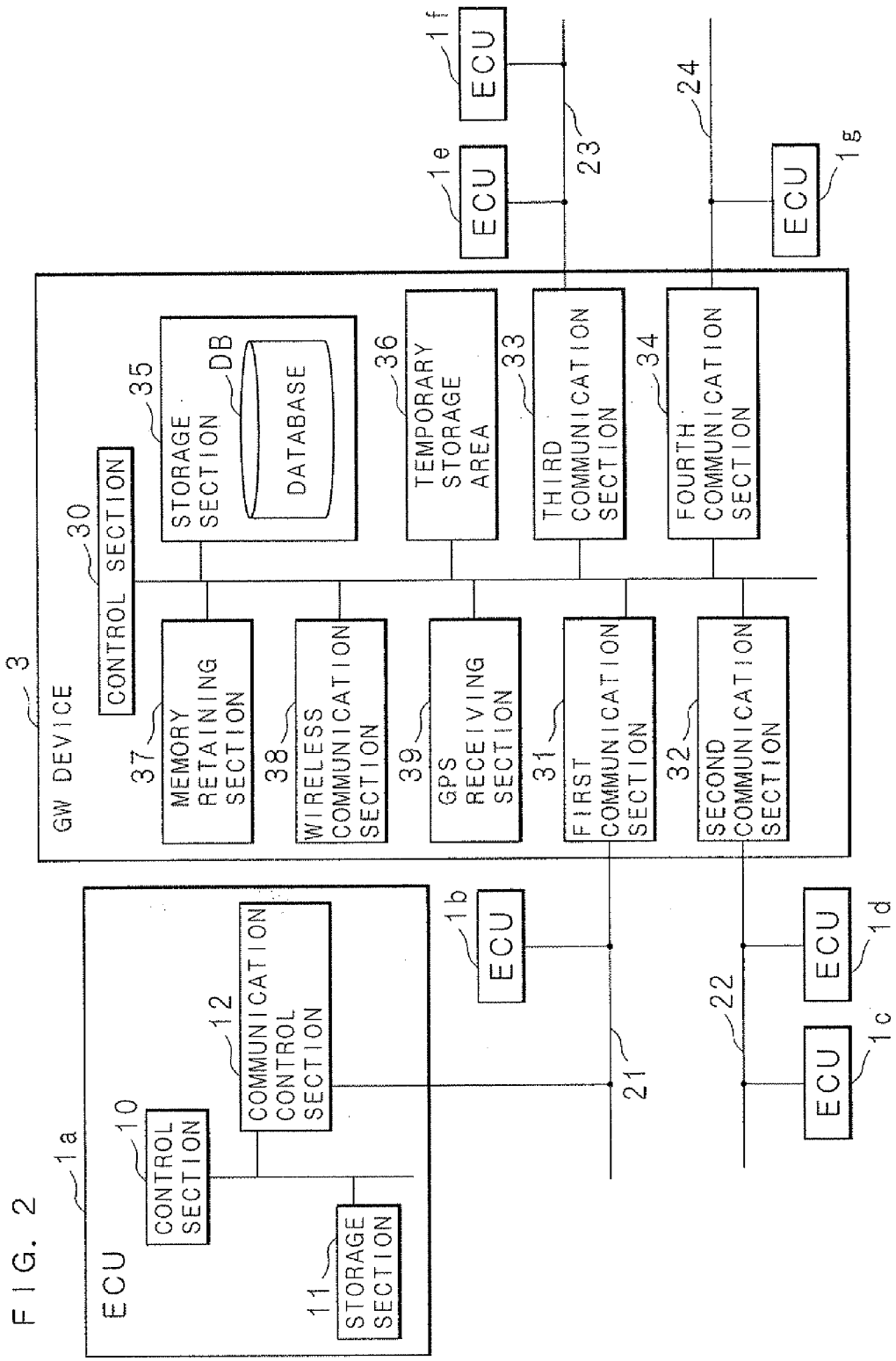
FIG. 2 is a block diagram illustrating the internal structures of an ECU, a GW device, a central device, and a terminal device constituting the vehicle information communication system of Embodiment 1.
Figure 3:
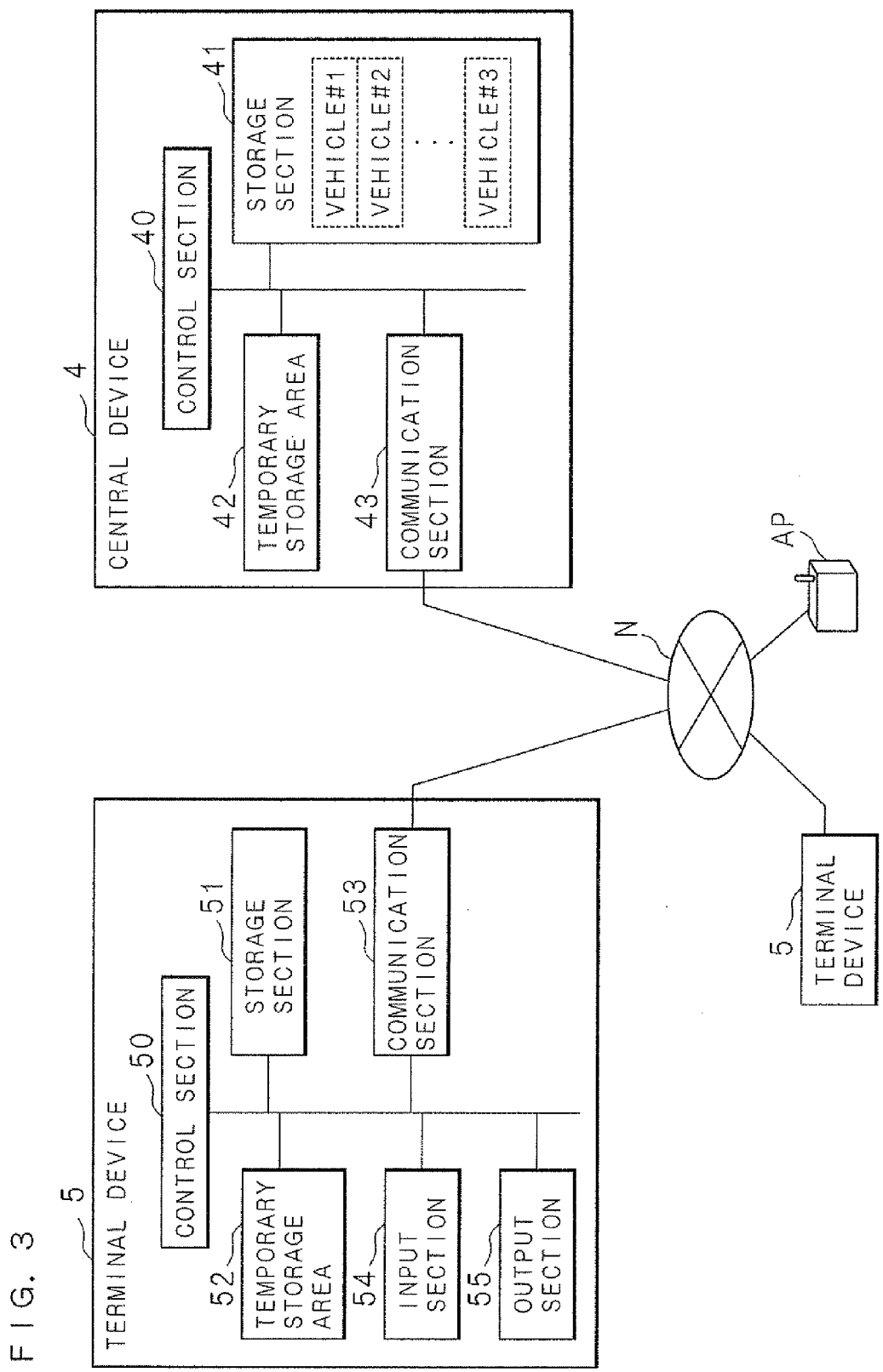
FIG. 3 is a block diagram illustrating the internal structures of the ECU, GW device, central device, and terminal device constituting the vehicle information communication system of Embodiment 1.

FIG. 2 and FIG. 3 are block diagrams illustrating the internal structures of the ECUs 1a, 1b, 1c, 1d, 1e, 1f, 1g, ..., the GW device 3, the central device 4 and the terminal device 5 constituting the vehicle information communication system of Embodiment 1.

FIG. 2 illustrates the internal structures of the ECU 1a and the GW device 3 mounted in the vehicle, and FIG. 3 illustrates the internal structures of the central device 4 and the terminal devices 5, 5, ... mounted in the vehicle information management center, dealership, and service station, respectively.

The ECU 1a comprises a control section 10 for controlling the operation of each component section, a storage section 11 for storing data necessary for control, and a communication control section 12 for controlling communication with the communication line 21. Since the internal structures of other ECUs 1b, 1c, 1d, 1e, 1f, 1g ... are the same as that of the ECU 1a, detailed explanation thereof will be omitted.

The control section 10 of the ECU 1a is supplied with electric power from an electric power supply device, such as a battery and alternator of a vehicle, not shown, and controls the operation of each component section.

The storage section 11 uses a volatile memory and temporarily stores various types of information generated in the course of processes performed by the control section 10, a measured value indicated by a signal inputted from the sensor, or data received from the GW device 3.

The communication control section 12 has a network controller chip and realizes communication with the communication line 21. The control section 10 sends and receives data through the communication control section 12 at predetermined time intervals of, for example, 10 milliseconds. More specifically, the data sent from the control section 10 of the ECU 1a is composed of a pair of identification information (ID) representing the attribute of data, such as wheel speed, and a specific value of data.

The GW device 3 comprises: a control section 30 for controlling the operation of each component section; a first communication section 31 connected to the communication line 21; a second communication section 32 connected to the communication line 22; a third communication section 33 connected to the communication line 23; a fourth communication section 34 connected to the communication line 24; a storage section 35 using a volatile memory such as a DRAM (Dynamic Random Access Memory), an SRAM (Static Random Access Memory); a temporary storage area 36 using similarly a volatile memory such as a DRAM, an SRAM; a memory retaining section 37 using a non-volatile memory such as an EPROM (Erasable Programmable Read Only Memory), an EEPROM (Electrically EPROM), and a flash memory; a wireless communication section 38 for realizing wireless communication; and a GPS receiving section 39 for receiving radio waves from GPS (Global Positioning System) satellites.

The control section 30 uses an MPU (Micro Processing Unit), is supplied with electric power from an electric power supply device, such as a battery and alternator of the vehicle, not shown, and controls the operation of each component section.

The first communication section 31 realizes sending and receiving of data with the ECUs 1a and 1b connected through the communication line 21. Similarly, the second communication section 32 realizes sending and receiving of data with the ECUs 1c and 1d connected through the communication line 22, the third communication section 33 realizes sending and receiving of data with the ECUs 1e and 1f connected through the communication line 23, and the fourth communication section 34 realizes sending and receiving of data with the ECU 1g connected through the communication line 24.

The storage section 35 has a storage area for a database DB for recording data received from the ECUs 1a, 1b, 1c, 1d, 1e, 1f, 1g, ... by the control section 30. Note that it may be possible to provide the database DB in an area within a storage device existing outside the GW device 3 so that it is readable and rewritable from the GW device 3.

The temporary storage area 36 has a storage capacity several times greater than the data size of database DB. As to be described later, copies of database DB at a plurality of time points are consecutively stored in the temporary storage area 36. The memory retaining section 37 has a storage capacity equal to or greater than the storage capacity of the temporary storage area 36. The copies of database DB at a plurality of time points stored in the temporary storage area 36 are further copied and stored into the memory retaining section 37.

The wireless communication section 38 uses a RF (Radio Frequency) transceiver and realizes wireless data communication. The control section 30 is capable of sending a copy group of database DB stored in the memory retaining section 37 to an external device through the wireless communication section 38.

The GPS receiving section 39 obtains time information from radio waves sent from GPS satellites. The control section 30 is capable of obtaining time information at each time point through the GPS receiving section 39. Note that the control section 30 may also calculate the positional information about the vehicle based on the time information obtained from the GPS receiving section 39.

The central device 4 is composed of a server computer apparatus and includes a control section 40 using a CPU (Central Processing Unit), a storage section 41 using a large-capacity storage medium such as a hard disk, a temporary storage area 42 using a DRAM, and a communication section 43 using a network controller.

The control section 40 controls each component section by retrieving and executing a control program stored in the storage section 41. In addition to the above-mentioned control program, the storage section 41 stores a copy group of database DB received from each vehicle, information about vehicle type, dealership and service station, and vehicle management information including vehicle's owner information for each vehicle as a database. The temporary storage area 42 temporarily stores various types of information generated when the control section 40 executes processes. The communication section 43 realizes data communication through the network N.

By retrieving and executing the control program, the control section 40 realizes various kinds of processes, such as the process of storing a copy group of database DB for each vehicle received through the communication section 43 into the storage section 41, and the process of searching for the vehicle management information stored in the storage section 41 from an external device through the communication section 43, or an input process.

The terminal device 5 is composed of a personal computer apparatus, and includes a control section 50 using a CPU, a storage section 51 using a storage medium such as a hard disk, a temporary storage area 52 using a DRAM, a communication section 53 using a network controller, an input section 54 for receiving an input from an input device such as a keyboard, a mouse, and an output section 55 for outputting data to an output device such as a display, a speaker.

The control section 50 controls each component section by retrieving and executing various programs stored in the storage section 51. Various types of information generated when the control section 50 executes processes are stored temporarily in the temporary storage area 52. The communication section 53 realizes communication with the central device 4 through the network N.

The control section 50 is capable of receiving search information inputted by a user using the input device and sending it to the central device 4, and also capable of receiving information sent from the central device 4 and timely displaying it on the display with the output section 55.

Referring to the flowchart, the following will explain a process executed by the control section 30 of the GW device 3 in the vehicle information communication system configured as described above.

When the control section 30 of the GW device 3 receives various attribute data such as the "wheel speed" and "steering angle" from the ECUs 1a, 1b, 1c, 1d, 1e, 1f, 1g, ..., it records specific values, such as measured values, calculated values and control values indicated by the data, for each data attribute in the database DB. Then, the control section 30 timely relays and sends the data recorded in the database DB to the ECUs 1a, 1b, 1c, 1d, 1e, 1f, 1g, ... which require the data. For the timing of receiving the data by the control section 30 and the timing of sending the data by the control section 30, the periods are separated so that the receiving period and the sending period repeatedly come one after another. The control section 30 continues to receive data sent from the ECUs 1a, 1b, 1c, 1d, 1e, 1f, 1g, ... during the receiving period, and timely sends the data retrieved from the database DB to the ECUs 1a, 1b, 1c, 1d, 1e, 1f, 1g, ... during the sending period. Since the GW device 3 includes the storage section 35 to record all the data in the database DB, it is possible to timely sent the data in the timing required by the ECUs 1a, 1b, 1c, 1d, 1e, 1f, 1g, ... on the receiving end, and thus the data is efficiently relayed and the amount of communication on the communication lines 21, 22, 23 and 24 is reduced compared to a relay structure in which every time the GW device 3 receives data sent from the ECUs 1a, 1b, 1c, 1d, 1e, 1f, 1g, ..., the data is sent to other ECUs 1a, 1b, 1e, 1d, 1e, 1f, 1g, ....

By receiving data from each of the ECUs 1a, 1b, 1c, 1d, 1e, 1f, 1g, ... at least once during the receiving period, the database DB reflects the latest data from all the ECUs 1a, 1b, 1c, 1d, 1e, 1f, 1g, ... at the end of the receiving period. Compared to the structure in which every time data is received from the ECUs 1a, 1b, 1c, 1d, 1e, 1f, 1g, ..., the data is sent to other ECUs 1a, 1b, 1c, 1d, 1e, 1f, 1g, ..., the latest data is collected in the database DB at respective time points, and therefore, as described below, all the data indicating the condition of the entire vehicle at a certain time point is retained and effectively used for diagnosing the vehicle.

Figure 4:
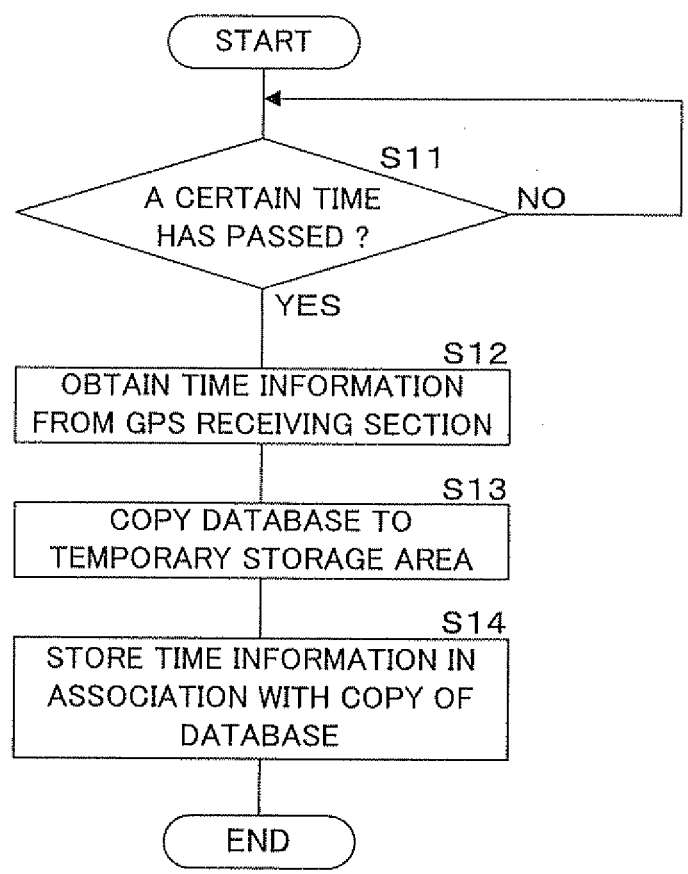
FIG. 4 is a flowchart illustrating one example of the procedure to be executed by a control section of the GW device of Embodiment 1 to store data in a database into a temporary storage area.

FIG. 4 is a flowchart illustrating one example of the procedure to be executed by the control section 30 of the GW device 3 of Embodiment 1 to store data in the database DB into the temporary storage area 36.

The control section 30 determines whether or not a certain time of, for example, 10 seconds has passed (step S11). When the control section 30 determines that the certain time has not passed (S11: NO), it returns the process to step S11.

When the control section 30 determines that the certain time has passed (S11: YES), it obtains time information at this time point from the GPS receiving section 39 (step S12), and copies the database DB in the storage section 35 at this time point to the temporary storage area 36 (step S13). When storing a copy of database DB in the temporary storage area 36 in step S13, the control section 30 stores the time information obtained in step S12 in association with the copy of database DB (step S14) and finishes the process.

Here, the timing of obtaining time information in step S12 may be after the process of storing the copy of database DB in step S13.

The control section 30 repeats the processes illustrated in the flowchart of FIG. 4, and temporarily stores the database DB, which is updated every time the receiving period comes, in the temporary storage area 36 at certain time intervals of 10 seconds or so. Since the storage capacity of the temporary storage area 36 is limited, the control section 30 stores the database DB in the temporary storage area 36 by an FIFO (First In First Out) method. In other words, the control section 30 rewrites the latest copy of database DB in the area of the oldest copy of database DB stored in the temporary storage area 36. It is desired to divide the temporary storage area 36 into a plurality of areas and use them cyclically to obtain copies of database DB in a time series.

In the case where the temporary storage area 36 with a storage capacity about 60 times greater than the entire data size of database DB is prepared and a copy of database DB is stored in the temporary storage area 36 every time 10 seconds have passed, a change of database DB with time in the last 10 minutes is stored in the temporary storage area 36.

The control section 30 further copies a copy group of database DB at a plurality of time points stored in the temporary storage area 36 to the memory retaining section 37 at predetermined time intervals, for example, once every three months, or every 1000 km drive, and also sends the copy group of database DB stored in the memory retaining section 37 to the central device 4.

Figure 5:
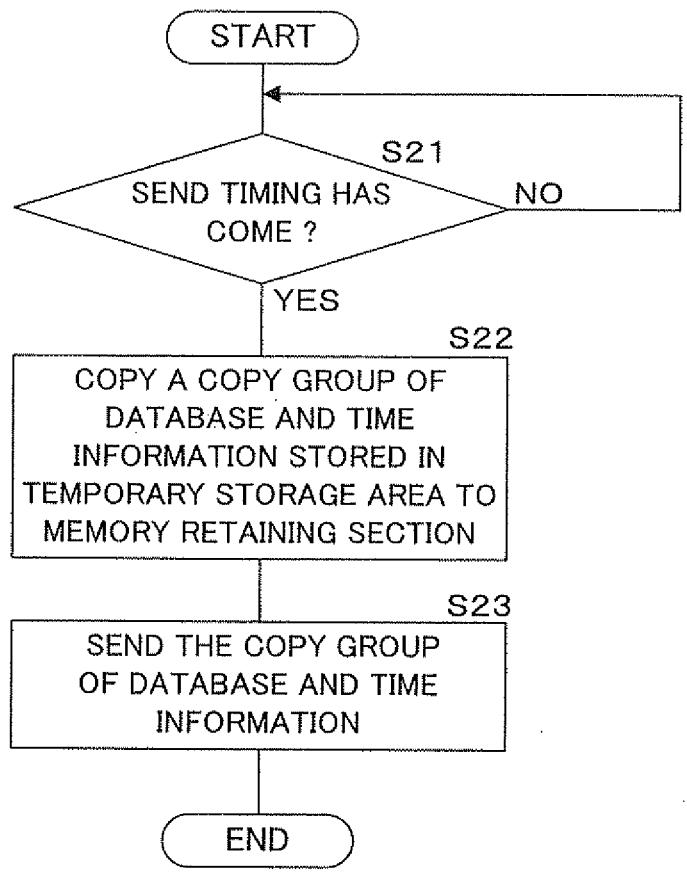
FIG. 5 is a flowchart illustrating one example of the procedure to be executed by the control section of the GW device of Embodiment 1 to send a copy group of database stored in the temporary storage area to the central device at predetermined intervals.

FIG. 5 is a flowchart illustrating one example of the procedure to be executed by the control section 30 of the GW device 3 of Embodiment 1 to send a copy group of database DB stored in the temporary storage area 36 to the central device 4 at predetermined intervals.

The control section 30 determines whether or not the send timing has come at a predetermined interval (step S21). When the control section 30 determines that the send timing has not come (S21: NO), it returns the process to step S21.

When the control section 30 determines that the send timing has come (S21: YES), it further copies a copy group of database DB at this time point and time information associated with each copy of database DB stored in the temporary storage area 36 to the memory retaining section 37 (step S22). The control section 30 sends the copy group of database DB and time information copied to the memory retaining section 37 through the wireless communication section 38 to the central device 4 (step S23) and finishes the process.

When sending the copy group of database DB and time information to the central device 4 in step S23, the control section 30 also sends identification information identifying the vehicle. Thus, the central device 4 is able to store the copy group of database DB and time information in the storage section 41 for each vehicle.

The control section 30 repeats the procedure illustrated in the flowchart of FIG. 5, and, every time the send timing has come, it sends a copy group of database in the last several minutes from this time point together with time information to the central device 4. Note that the copy group of database DB in the temporary storage area 36 is rewritten consecutively and is lost when power is not supplied, but the stored data is retained until the next sending timing comes and the data is rewritten because the memory retaining section 37 uses a non-volatile memory. Therefore, if the GW device 3 is configured to be able to obtain data stored in the memory retaining section 37 from an external device, it is possible to grasp the contents of the copy group of database DB later.

Figure 6:
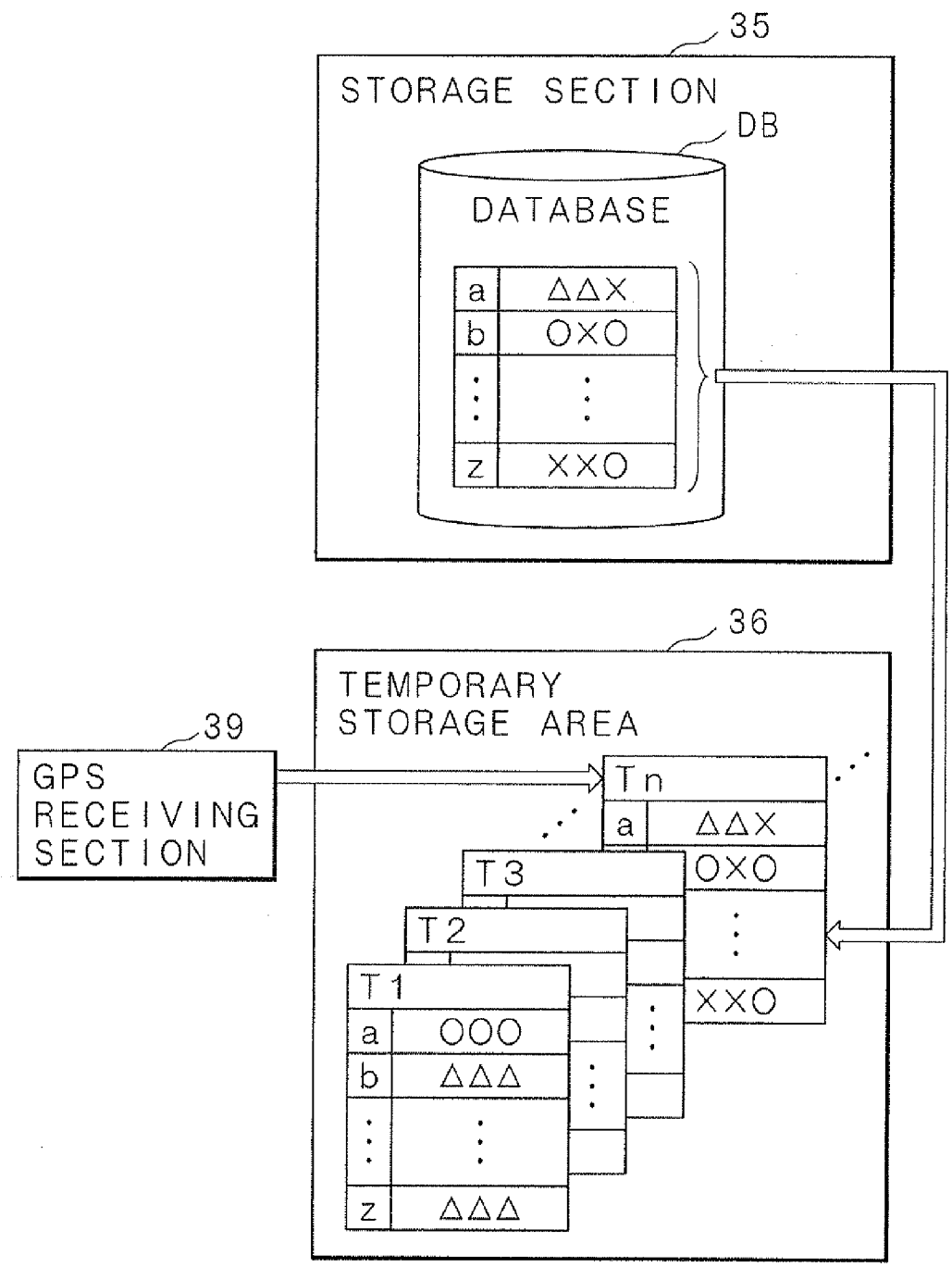
FIG. 6 is a schematic view schematically illustrating one example of the contents of database DB in a storage section of the GW device of Embodiment 1, and the contents stored in the temporary storage area.

FIG. 6 is a schematic view schematically illustrating one example of the contents of database DB in the storage section 35 of the GW device 3 of Embodiment 1, and the contents stored in the temporary storage area 36.

As illustrated in the schematic view of FIG. 6, pairs of data identification information and data value received from the ECUs 1a, 1b, 1c, 1d, 1e, 1f, 1g . . . are stored in the database DB in the storage section 35. In the example of FIG. 6, identification information "a", "b", "z" is assigned to the respective data, and numerical information about various physical amounts, such as the measured values, calculated values and control values, are recorded as specific values. The identification information "a", "b", . . . , "z" may be "wheel speed" and "steering wheel angle" indicating data attributes.

The control section 30 copies the database DB to the temporary storage area 36 at certain time intervals. The schematic view of FIG. 6 illustrates that the time information obtained from the GPS receiving section 39 is stored in association with the copy of database DB stored in the temporary storage area 36, respectively. In the example illustrated in the schematic view of FIG. 6, a copy group of database DB at time information T1, T2, and T3 is stored in the temporary storage area 36, and a copy of database DB at time information Tn obtained currently from the GPS receiving section 39 is further stored.

The copy group of database DB at respective time points T1, T2, T3, . . . , Tn stored in the temporary storage area 36 as illustrated in the schematic view of FIG. 6 is copied to the memory retaining section 37 at predetermined intervals and sent to the central device 4.

By providing the GW device 3 with a storage area for use as a database DB, recording data received from the ECUs 1a, 1b, 1c, 1d, 1e, 1f, 1g, . . . mounted in the vehicle into the database DB and timely sending the data to other ECUs 1a, 1b, 1c, 1d, 1e, 1f, 1g, . . . connected to different communication lines 21, 22, 23 and 24, the data is efficiently relayed and the communication burden on the communication lines 21, 22, 23 and 24 is reduced. Also, by retaining the contents of database DB at respective time points at predetermined intervals, the condition of each vehicle in the past is reproducible.

The contents of database DB of each vehicle at respective time points are sent to the central device 4, and the control section 40 of the central device 4 stores the received copy group of database DB and time information for each vehicle. Thus, in the storage section 41 of the central device 4, information indicating the condition of each vehicle at each time point is stored as a database. For example, when the control section 40 of the central device 4 retrieves and executes the control program, it is possible to search for the condition of each vehicle at respective time points in the past and automatically determine whether or not maintenance work is necessary from the condition at the respective time points and a change of the condition with time. Since the control section 40 of the central device 4 is capable of comparing the entire condition of each vehicle with predetermined abnormality conditions to make a determination, it is possible to detect an abnormality in the vehicle that the user of the vehicle has not noticed, or an omen that appears before an abnormality is detected. When the control section 40 of the central device 4 determines that maintenance work is necessary, it specifies the information about the owner and a dealership where the vehicle had inspection recently from the identification information about the vehicle, and gives the information to the terminal device 5, thereby realizing the service of asking the owner to make a contact.

Moreover, when inspecting a vehicle at the time of legal inspection etc., the inspection staff is able to access the central device 4 by using the terminal device 5, obtain the information indicating the condition at a plurality of time points in the past and display it with the output section 55. Since the staff grasps not only the condition of the vehicle at the inspection time, but also the past information, it is possible to detect further minute defects. In addition, since the condition of the entire vehicle in the past is reproducible, there is a higher possibility that the cause of a problem detected at the time of inspection is quickly investigated. Note that the copy group of database DB and time information stored in the memory retaining section 37 of the GW device 3 may be arranged to be readable and erasable by a device used exclusively by the staff in the service stations and dealerships.

Embodiment 2

In the vehicle information communication system of Embodiment 1, the control section 30 of the GW device 3 of a vehicle stores copies of database DB and time information stored in the temporary storage area 36 to the memory retaining section 37 at predetermined intervals and sends them to the central device 4 as an external device. In Embodiment 2, a control section 30 of a GW device 3 of a vehicle detects occurrence of a problem, copies the contents in a temporary storage area 36 at the time of detection of the occurrence of the problem to a memory retaining section 37, and sends them to a central device 4.

The hardware configuration of the vehicle information communication system of Embodiment 2 is similar to that of the vehicle information communication system of Embodiment 1, the same reference numbers are assigned to the common structures and detailed explanation of each component section will be omitted. Referring to a flowchart, the following will explain the contents of processes performed by the control section 30 of a GW device 3 different from that in Embodiment 1.

Figure 7:
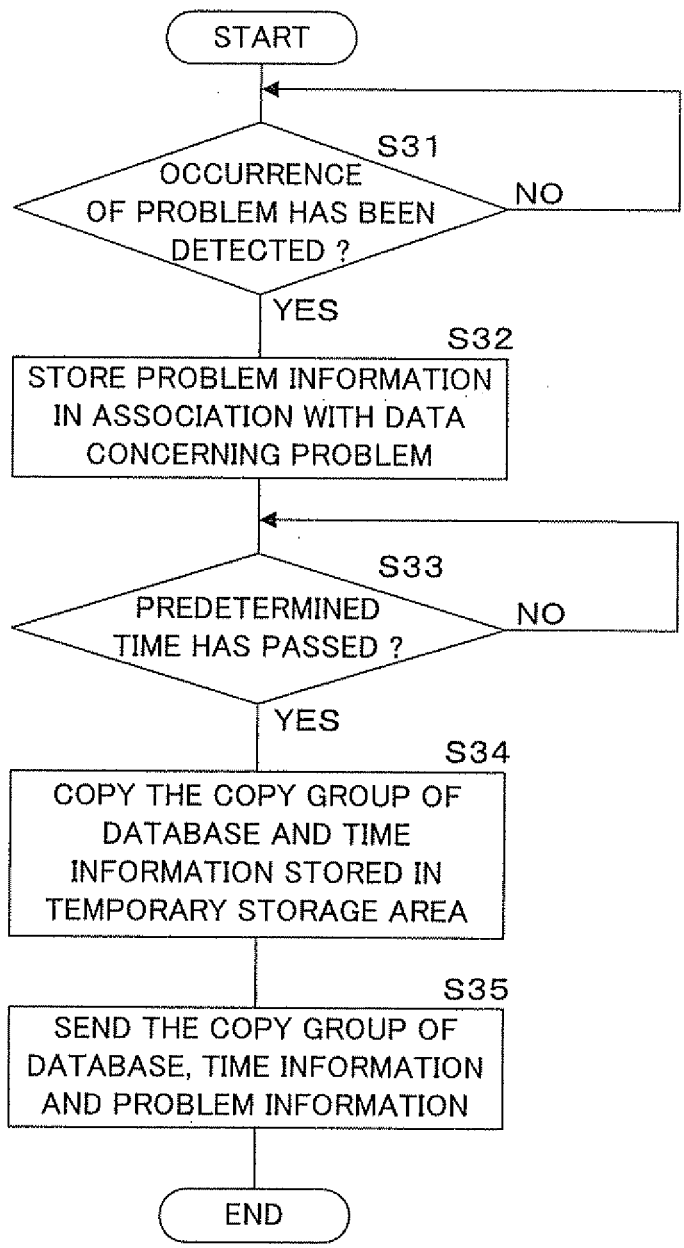
FIG. 7 is a flowchart illustrating one example of the procedure to be executed by a control section of a GW device of Embodiment 2 to send a copy group of database stored in the temporary storage area to the central device when a problem occurs.

FIG. 7 is a flowchart illustrating one example of the procedure to be executed by the control section 30 of the GW device 3 of Embodiment 2 to send a copy group of database DB stored in the temporary storage area 36 when a problem occurs.

The control section 30 continuously executes the procedure illustrated in the flowchart of FIG. 4 of Embodiment 1. In the temporary storage area 36, a copy group of database DB in the last predetermined period is stored.

The control section 30 determines whether or not occurrence of a problem has been detected in any of the ECUs 1a, 1b, 1c, 1d, 1e, 1f, 1g, connected to the GW device 3 with the communication lines 21, 22, 23 and 24 (step S31).

Detection of the occurrence of a problem is performed by each of the ECUs 1a, 1b, 1c, 1d, 1e, 1f, 1g, . . . by self-diagnosis. In the ECUs 1a, 1b, 1c, 1d, 1e, 1f, 1g, . . . , when a problem or an omen of problems is detected, data including a value indicating that a problem or an omen of problems has been detected is sent.

As a specific example, when the ECU 1a detects a problem by self-diagnosis, it sends flag information indicating the problem in addition to data including a measured value of wheel speed sent from a sensor, which was used as the basis of self-diagnosis. In the case where the control section 30 of the GW device 3 receives the identification information for wheel speed and data including the actual measured value of wheel speed through the first communication section 31, if the flag information indicating a problem is added to the data, the control section 30 determines that a problem has been detected, and stores the data including the measured value of the wheel speed in the database DB.

Note that the present invention is not limited to the structure where each of the ECUs 1a, 1b, 1c, 1d, 1e, 1f, 1g detects occurrence of a problem by self-diagnosis. The control section 30 of the GW device 3 which collects data sent from the ECUs 1a, 1b, 1c, 1d, 1e, 1f, 1g . . . in the database DB may compare the specific numerical information about data recorded in the database DB with conditions for detecting abnormalities to detect occurrence of problems.

When the control section 30 determines that occurrence of a problem has not been detected (S31: NO), it returns the process to step S31. In this case, the control section 30 continues to perform an update process in which every time data is received, the control section 30 stores the data in the database DB in the storage section 35 for update, and the process of timely sending data retrieved from the database DB to the ECUs 1a, 1b, 1c, 1d, 1e, 1f, 1g, . . . , and also continues to perform the process of copying the database DB to the temporary storage area 36 every time a certain time has passed as illustrated in the flowchart of FIG. 4.

When the control section 30 determines that occurrence of a problem has been detected (S31: YES), it stores in the memory retaining section 37 problem information (diagnostic code) indicating the symptoms of the problem in association with data concerning the problem within the copies of database DB stored in the temporary storage area 36 (step S32).

More specifically, when the control section 30 receives data about the wheel speed and determines, based on the addition of flag information indicating a problem to the data, that occurrence of a problem has been detected, it additionally stores the identification information about the wheel speed data together with the problem information when storing the copy of database DB in the temporary storage area 36. Thus, when the occurrence of a problem is detected by self-diagnosis, the symptoms and cause of the problem are associated with specific numerical information about the data at this time point. This is useful when investigating the cause of the problem by browsing information about each vehicle stored in the central device 4 later, or by obtaining information from the memory retaining section 37 later.

The control section 30 determines whether or not a predetermined time has passed after the detection of the occurrence of the problem (step S33). When the predetermined time has not passed (S33: NO), the control section 30 returns the process to step S33.

In this case, the predetermined time is the time taken for copying the database DB equivalent to about a half of the storage capacity of the temporary storage area 36. More specifically, when the storage capacity of the temporary storage area 36 is about 60 times greater than the data size of database DB, the predetermined time is the time taken for copying the database DB thirty times to the temporary storage area 36, that is, five minutes. In this case, if a copy of database DB is stored once in every 10 seconds, the copy group of database DB stored in the temporary storage area 36 after the predetermined time has passed corresponds to the condition of the entire vehicle in a period between about five minutes before and after the time point at which the problem was detected.

When the control section 30 determines that the predetermined time has passed (S33: YES), it stores the copy group of database DB and time information associated with the respective copies stored in the temporary storage area 36 until then by copying them to the memory retaining section 37 (step S34), sends the stored copy group of database DB, time information and problem information to the central device 4 (step S35), and finishes the process. In step S35, the control section 30 also sends the identification information about the vehicle.

Thus, the information indicating the condition of the entire vehicle in a period between several minutes before and after the time point at which a problem was detected is stored in the central device 4, and is browsed using the terminal devices 5, 5 . . . . Moreover, since the information is sent when the control section 30 of the GW device 3 detects a problem, the occurrence of a problem in a vehicle having the GW device 3 is recognized with the central device 4, and the occurrence of the problem is reported to the dealership, or the service station, providing inspection service for the vehicle. Furthermore, since the information indicating the condition of the entire vehicle in the period between several minutes before and after the time point at which the problem occurred is sent from the GW device 3, it is possible to send the information to the dealership, or the service station, providing inspection service. Therefore, before the user who recognized the occurrence of the problem arrives at the dealership or the service station, the staff grasps the condition of the problem and is able to prepare parts, if necessary, thereby quickly dealing with the problem.

In step S35, the control section 30 may also send positional information about the vehicle which is calculated based on the time information obtained from the GPA receiving section 39. Hence, the control section 30 of the central device 3 is able to search for a dealership or a service station closest to the current location of the vehicle based on the received positional information, and report the occurrence of the problem to the found dealership or service station. In this case, the control section 30 of the GW device 3 receives the information from the central device 4 through the wireless communication section 38 and informs the passenger of the occurrence of the problem by outputting the received information through the display section or speaker mounted in the vehicle, and is also able to output the contact address or number of the found dealership or service station through the central device 4. Hence, the problem of the vehicle is dealt with more quickly.

Thus, the operations of the GW device 3 and the central device 4 of Embodiment 2 make the passenger more understand the necessity of dealing with the problem than by simply turning on a warning lamp based on self-diagnosis of each of the ECUs 1a, 1b, 1c, 1d, 1e, 1f, 1g, . . . , and make the dealership or the service station understand the condition of the vehicle at the time of the occurrence of the problem and in a period between several minutes before and after the occurrence of the problem, and investigate the cause of the problem in detail and quickly deal with the problem.

In Embodiment 2, when the occurrence of a problem is detected, the central device 4 sends the copy group of database DB, time information and problem information, but it may be possible to combine this structure with the processes of Embodiment 1. More specifically, the control section 30 of the GW device 3 sends the copy group of database DB and time information stored in the temporary storage section 36 at predetermined intervals, and also sends the information stored in the temporary storage area 36 when occurrence of a problem is detected. Therefore, when a problem occurs in a vehicle and the vehicle is brought to a dealership or a service station, the staff understands not only the condition of the vehicle at the time of occurrence of the problem and in a period between several minutes before and after the occurrence of the problem, but also the condition in the past.

Embodiment 3

In Embodiments 1 and 2, the control section 30 of the GW device 3 in a vehicle stores the copy group of database DB and time information stored in the temporary storage section 36 into the memory retaining section 37 at predetermined time intervals, or at the timing of detecting the occurrence of a problem, and sends them to the central device 4. In Embodiment 3, a send request for vehicle information is sent from the central device 4, or from the terminal devices 5, 5, . . . via the central device 4, and the GW device 3 receives the send request and sends the copy group of database DB and time information stored in the temporary storage area 36 and further the copy group of database DB, time information and problem information (diagnostic code) stored in the memory retaining section 37 until then, to the central device 4.

Since the hardware configuration of a vehicle information communication system of Embodiment 3 is similar to that of the vehicle information communication system of Embodiment 1, the same reference numbers are assigned to the common structures and detailed explanation of each component section will be omitted. Referring to the flowchart, the following will explain the contents of processes performed by the control section 30 of a GW device 3 different from that in Embodiments 1 and 2.

Figure 8:
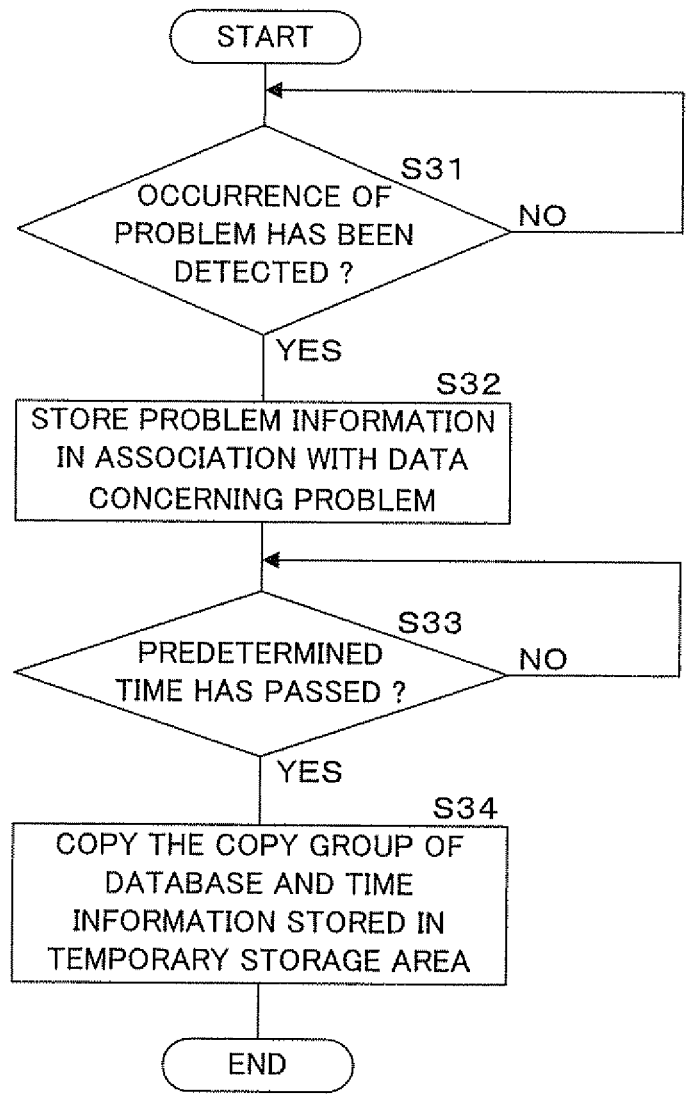
FIG. 8 is a flowchart illustrating one example of the procedure to be executed by a control section of a GW device of Embodiment 3 to store data in a database into a temporary storage area.

FIG. 8 is a flowchart illustrating one example of the procedure to be executed by the control section 30 of the GW device 3 of Embodiment 3 to store data in database DB into the temporary storage area 36. The procedure illustrated in the flowchart of FIG. 8 is similar to the procedure illustrated in the flowchart of FIG. 7 of Embodiment 2, and the only difference is the presence or absence of part of processes. Therefore, the same step numbers are assigned to the common processing steps and detailed explanation thereof will be omitted.

The control section 30 continuously executes the procedure illustrated in the flowchart of FIG. 4 of Embodiment 1, and a copy group of database DB in the last predetermined period is stored in the temporary storage area 36.

The control section 30 determines whether or not occurrence of a problem has been detected (step S31). When determined that a problem has not been detected (S31: NO), the control section 30 returns the process to step S31. When the control section 30 determines that a problem has been detected (S31: YES), it performs the process of storing data relating to the occurrence of the problem and problem information (step S32). The control section 30 determines whether or not a predetermined time has passed (step S33). When determined that the predetermined time has not passed (S33: NO), the control section 30 returns the process to step S33. When the control section 30 determines that the predetermined time has passed (S33: YES), it stores the copy group of database DB and time information associated with the respective copies stored in the temporary storage area 36 until then by copying them to the memory retaining section 37 (step S34), and finishes the process.

Thus, the information indicating the condition of the entire vehicle at the time of the occurrence of the problem and before and after the occurrence of the problem is retained in the memory retaining section 37. In Embodiment 3, the information is not automatically sent from the GW device 3, but is sent upon receipt of a send request from the central device 4.

Figure 9:
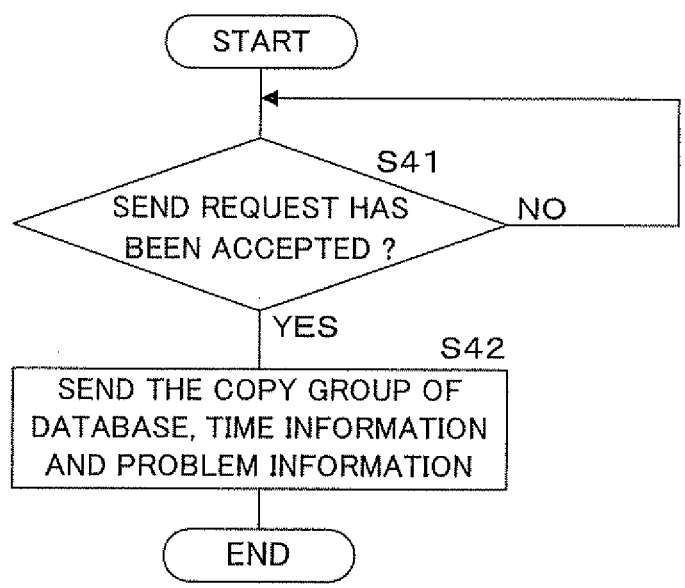
FIG. 9 is a flowchart illustrating one example of the procedure to be executed by the control section of the GW device of Embodiment 3 to send data stored in a memory retaining section to a central device.

FIG. 9 is a flowchart illustrating one example of the procedure to be executed by the control section 30 of the GW device 3 of Embodiment 3 to send the data stored in the memory retaining section 37 to the central device 4.

The control section 30 determines whether or not a send request from the central device 4 has been accepted through the wireless communication section 38 (step S41). When the control section 30 determines that a send request has not been accepted (541: NO), it returns the process to step S41.

When the control section 30 determines that a send request has been accepted (S41: YES), it sends the copy group of database DB, time information and problem information (diagnostic code) stored in the memory retaining section 37 to the central device 4 through the wireless communication section 38 (step S42), and finishes the process.

Thus, with the structure in which copy group of database DB at respective time points and time information are sent according to a send request from the central device 4, it is possible to send information indicating the condition of a vehicle at any timing. For example, in the case where a dealership or a service station to which the user should bring the vehicle is not determined, the information may be sent through the central device 4 to a terminal device 5 in a dealership or a service station to which the user reported the occurrence of a problem at the timing the staff in the dealership or the service station uses the terminal device 5 to grasp the condition.

Thus, by providing the GW device 3 with a storage area for use as database DB, recording data received from the ECUs 1a, 1b, 1c, 1d, 1e, 1f, 1g, . . . mounted in vehicles into the database DB and timely sending the data, the data is efficiently relayed and the communication burden on the communication lines 21, 22, 23 and 24 is reduced. Moreover, by storing the contents of database DB at each time point, retaining the stored copy group of database DB at a plurality of time points and time information and sending them to an external device periodically at predetermined intervals, or when a problem occurs, the condition of the vehicle at a plurality of time points is reproducible. It is therefore possible to provide advantageous effects, such as good preparation for handling at periodic diagnosis for vehicle and occurrence of a problem, and an improvement in the possibility of quickly investigating the cause of problems which could not have been investigated due to poor reproduction performance.

The GW device 3 of Embodiments 1 to 3 receives data from all the ECUs 1a, 1b, 1c, 1d, 1e, 1f, 1g, . . . mounted in a vehicle and records them in the database DB. However, the GW device 3 may be constructed not so as to record data from a part of the ECUs, such as data which is not used by other ECU. Moreover, even when all the data from all the ECUs 1a, 1b, 1c, 1d, 1e, 1f, 1g, . . . are recorded in the database DB, it is possible to omit part of the data when copying the data to the temporary storage area 36.

The storage section 35 of the GW device 3 of Embodiments 1 to 3 may be a storage device different from that of the GW device 3, or may be configured similarly so that the temporary storage area 36 and the memory retaining section 37 are provided externally and connected. In particular, in the case where information stored in the memory retaining section 37 is retrievable and erasable with a special device, other device including an interface for retrieval performs the function of the memory retaining section 37 and is connected to the GW device 3.

Furthermore, the GPS receiving section 39 in the GW device 3 of Embodiments 1 to 3 may be realized by a different device and connected to the GW device 3 so that the control section 30 obtains time information.

In Embodiments 1 to 3, as illustrated in the flowchart of FIG. 4, the control section 30 of the GW device 3 continues to store the database DB into the temporary storage area 36 in a time series every time a certain time has passed, irrespective of occurrence of a problem. However, the present invention is not limited to this and may be configured to start storing the database DB into the temporary storage area 36 only when occurrence of a problem is detected, or when an omen of problems is detected, and finish the process after a predetermined time has passed from the detection of the occurrence of the problem. Consequently, compared to the case where the copying process to the temporary storage area 36 is performed even when a vehicle is in normal condition, the processing burden is reduced.

The disclosed embodiments are illustrative and not restrictive in all aspects. The scope of the invention is defined by the appended claims rather than by the description preceding them, and all changes that fall within metes and bounds of the claims, or equivalence of such metes and bounds thereof are therefore intended to be embraced by the claims.

What is claimed is:

1. A vehicle information recording apparatus which records data from a plurality of devices mounted in a vehicle, and is connected to a plurality of communication lines respectively to which the devices are connected respectively, the vehicle information recording apparatus comprising:
   a first storage section for storing part or all of data repeatedly sent from the respective devices through the plurality of communication lines;
   a sending section for sending the data stored in the first storage section on a request from each of the devices;
   a controller for updating the first storage section every time data is received; and
   a second storage section for storing part or all of the data stored in the first storage section in a time series, wherein the data stored in the second storage section in a time series is periodically updated,
   wherein the controller obtains time information every time the data is stored in the second storage section,
   the time information obtained by the controller is stored in the second storage section in association with the data,
   the sending section sends the data and time information stored in the second storage section to an external device,
   the controller detects an occurrence of a problem in the vehicle,
   problem information indicating a symptom of the problem is stored in the second storage section,
   storing of data in the second storage section continues after the controller detects occurrence of a problem, and
   the sending section sends the data and time information stored in the second storage section until a predetermined time has passed after the controller detected the occurrence of the problem, and the problem information to an external device.

2. The vehicle information recording apparatus according to claim 1, wherein
   the controller detects occurrence of a problem based on the received data, and
   when the controller detects occurrence of a problem, the problem information is stored in the second storage section in associated with the data.

3. The vehicle information recording apparatus according to claim 1, further comprising an accepting section for accepting a send request from an external device,
   wherein, when the accepting section accepts a send request, the sending section sends the data and time information stored in the second storage section.

4. The vehicle information recording apparatus according to claim 1, wherein the sending section sends the data and time information at predetermined intervals.

5. The vehicle information recording apparatus according to claim 1, wherein the sending section wirelessly sends the data and time information.

6. The vehicle information recording apparatus according to claim 1, being connected to the plurality of devices through the plurality of communication lines for different communication speeds.

7. A vehicle information recording apparatus which records data from a plurality of devices mounted in a vehicle, and is connected to a plurality of communication lines respectively to which the devices are connected respectively, the vehicle information recording apparatus comprising:
   a first storage unit configured to store part or all of data repeatedly sent from the respective devices through the plurality of communication lines;
   a sending unit configured to send the data stored in the first storage unit on a request from each of the devices;
   an updating unit configured to update the first storage unit every time data is received;
   a second storage unit configured to store part or all of the data stored in the first storage unit in a time series, wherein the data stored in the second storage unit in a time series is periodically updated;

an obtaining unit configured to obtain time information every time the data is stored in the second storage unit; and a detecting unit configured to detect an occurrence of a problem in the vehicle, wherein the time information obtained by the obtaining unit is stored in the second storage unit in association with the data, the sending unit sends the data and time information stored in the second storage unit to an external device, problem information indicating a symptom of the problem is stored in the second storage unit, storing of data in the second storage unit continues after the detecting unit detects occurrence of a problem, and the sending unit sends the data and time information stored in the second storage unit until a predetermined time has passed after the detecting unit detected the occurrence of the problem, and the problem information to an external device.

8. The vehicle information recording apparatus according to claim 7, wherein the detecting unit detects occurrence of a problem based on the received data, and when the detecting unit detects occurrence of a problem, the problem information is stored in the second storage unit in associated with the data.

9. The vehicle information recording apparatus according to claim 7, further comprising an accepting unit configured to accept a send request from an external device, wherein, when the accepting unit accepts a send request, the sending unit sends the data and time information stored in the second storage unit.

10. The vehicle information recording apparatus according to claim 7, wherein the sending unit sends the data and time information at predetermined intervals.

11. The vehicle information recording apparatus according to claim 7, wherein the sending unit wirelessly sends the data and time information.

12. The vehicle information recording apparatus according to claim 7, being connected to the plurality of devices through the plurality of communication lines for different communication speeds.

13. A vehicle information communication system, comprising:

a plurality of vehicle information recording apparatuses, wherein each of the vehicle information recording apparatuses records data from a plurality of devices mounted in a vehicle, and is connected to a plurality of communication lines respectively to which the devices are connected respectively, the respective vehicle information recording apparatuses comprising:

a first storage section for storing part or all of data repeatedly sent from the respective devices through the plurality of communication lines;

a sending section for sending the data stored in the first storage section on a request from each of the devices;

a controller for updating the first storage section every time data is received; and a second storage section for storing part or all of the data stored in the first storage section in a time series, wherein the data stored in the second storage section in a time series is periodically updated, wherein the controller obtains time information every time the data is stored in the second storage section, the time information obtained by the controller is stored in the second storage section in association with the data, the sending section sends the data and time information stored in the second storage section to an external device, the controller detects an occurrence of a problem in the vehicle, problem information indicating a symptom of the problem is stored in the second storage section, storing of data in the second storage section continues after the controller detects occurrence of a problem, and the sending section sends the data and time information stored in the second storage section until a predetermined time has passed after the controller detected the occurrence of the problem, and the problem information to an external device; and an information processing apparatus capable of wirelessly communicating with the vehicle information recording apparatuses, the information processing apparatus comprising:

a receiving section for receiving data and time information sent from the vehicle information recording apparatuses; and an information storage section for storing the received data and time information for each vehicle.

14. The vehicle information communication system according to claim 13, wherein the information processing apparatus further comprises a controller for determining, based on the data and time information stored for each vehicle, whether or not a vehicle needs maintenance by comparing the data indicating condition of the vehicle at respective time points, or a change in the data with time, with predetermined abnormality condition.

15. The vehicle information communication system according to claim 14, wherein the information processing apparatus is connected through a communication network to a plurality of terminal devices located respectively in shops for selling a vehicle or providing an inspection and maintenance service, and the controller of the information processing apparatus stores, for each vehicle, identification information about the vehicle and shop information in association with each other in the information storage section;

specifies shop information based on the identification information about the vehicle; and when determined that one vehicle needs maintenance, specifies shop information from the identification information about the one vehicle and reports the need of maintenance for the one vehicle to the terminal device located in the shop indicated by the shop information.

16. The vehicle information communication system according to claim 15, wherein each of the terminal devices comprises:

an obtaining section for obtaining data and time information for each vehicle stored in the information processing apparatus; and an outputting section for outputting the obtained data and time information.

17. A vehicle information communication system, comprising:

a plurality of vehicle information recording apparatuses, wherein each of the vehicle information recording apparatuses records data from a plurality of devices mounted in a vehicle, and is connected to a plurality of communication lines respectively to which the devices are connected respectively, the respective vehicle information recording apparatuses comprising:
a first storage unit configured to store part or all of data repeatedly sent from the respective devices through the plurality of communication lines;
a sending unit configured to send the data stored in the first storage unit on a request from each of the devices;
an updating unit configured to update the first storage unit every time data is received:
a second storage unit configured to store part or all of the data stored in the first storage unit in a time series, wherein the data stored in the second storage unit in a time series is periodically updated;
an obtaining unit configured to obtain time information every time the data is stored in the second storage unit; and
a detecting unit configured to detect an occurrence of a problem in the vehicle,
wherein the time information obtained by the obtaining unit is stored in the second storage unit in association with the data,
the sending unit sends the data and time information stored in the second storage unit to an external device,
problem information indicating a symptom of the problem is stored in the second storage unit,
storing of data in the second storage unit continues after the detecting unit detects occurrence of a problem, and
the sending unit sends the data and time information stored in the second storage unit until a predetermined time has passed after the detecting unit detected the occurrence of the problem, and the problem information to an external device; and
an information processing apparatus capable of wirelessly communicating with the vehicle information recording apparatuses, the information processing apparatus comprising:
a receiving unit configured to receive data and time information sent from the vehicle information recording apparatuses; and
an information storage unit configured to store the received data and time information for each vehicle.

18. The vehicle information communication system according to claim 17, wherein the information processing apparatus further comprises a determined unit configured to determine, based on the data and time information stored for each vehicle, whether or not a vehicle needs maintenance by comparing the data indicating condition of the vehicle at respective time points, or a change in the data with time, with predetermined abnormality condition.

19. The vehicle information communication system according to claim 18, wherein
the information processing apparatus is connected through a communication network to a plurality of terminal devices located respectively in shops for selling a vehicle or providing an inspection and maintenance service, and
the information processing apparatus further comprises:
a storing unit configured to store, for each vehicle, identification information about the vehicle and shop information in association with each other in the information storage unit;
a specifying shop information based on the identification information about the vehicle; and
a reporting unit configured to when the determining unit determines that one vehicle needs maintenance, shop information from the identification information about the one vehicle and report the need of maintenance for the one vehicle to the terminal device located in the shop indicated by the shop information.

20. The vehicle information communication system according to claim 19, wherein
each of the terminal devices comprises:
an obtaining unit configured to obtain data and time information for each vehicle stored in the information processing apparatus; and
an outputting unit configured to output the obtained data and time information.

21. A vehicle information communication method for communicating vehicle information with a vehicle information recording apparatus which records the vehicle information and is connected to a plurality of communication lines respectively to which a plurality of devices mounted in a vehicle are connected respectively, the method comprising:
the vehicle information recording apparatus receiving part or all of data repeatedly sent from the respective devices;
the vehicle information recording apparatus storing the received data in a first storage section;
the vehicle information recording apparatus sending the data stored in the first storage section on a request from each of the devices;
the vehicle information recording apparatus updating the first storage section every time data is received;
the vehicle information recording apparatus storing part or all of the data stored in the first storage section into a second storage section in a time series, wherein the data stored in the second storage section in a time series is periodically updated;
the vehicle information recording apparatus obtaining time information every time data is stored in the second storage section;
the vehicle information recording apparatus detecting occurrence of a problem in the vehicle;
the vehicle information recording apparatus storing the obtained time information in the second storage section in association with the data; and
the vehicle information recording apparatus sending the data and time information stored in the second storage section to an external device,
wherein problem information indicating a symptom of the problem is stored in the second storage section,
storing of data in the second storage section continues after the controller detects occurrence of a problem, and
the vehicle information recording apparatus sends the data and time information stored in the second storage section until a predetermined time has passed after the vehicle information recording apparatus detected the occurrence of the problem, and the problem information to an external device.

22. A vehicle information communication method for communicating vehicle information among a vehicle information recording apparatus which records the vehicle information and is connected to a plurality of communication lines respectively to which a plurality of devices mounted in a vehicle are connected respectively, an information processing apparatus capable of communicating with the vehicle information recording apparatus of each vehicle, and a plurality of terminal devices located in shops for selling a vehicle or providing a inspection and maintenance service, respectively, and connected to the information processing apparatus through a communication network,
the method comprising:
the vehicle information recording apparatus receiving part or all of data repeatedly sent from the respective devices;

the vehicle information recording apparatus storing the received data in a first storage section;

the vehicle information recording apparatus sending the data stored in the first storage section to each device on a request from the device;

the vehicle information recording apparatus updating the first storage section every time data is received;

the vehicle information recording apparatus storing part or all of the data stored in the first storage section into a second storage section in a time series, the data stored in the second storage section in a time series being periodically updated;

the vehicle information recording apparatus obtaining time information every time data is stored in the second storage section;

the vehicle information recording apparatus detecting an occurrence of a problem in the vehicle;

the vehicle information recording apparatus storing the obtained time information in the second storage section in association with the data;

the vehicle information recording apparatus sending the data and time information stored in the second storage section to the information processing apparatus, storing problem information indicating a symptom of the problem is stored in the second storage section;

continuing storing of data in the second storage section continues after the vehicle information recording apparatus detects occurrence of a problem;

the vehicle information recording apparatus sending the data and time information stored in the second storage section until a predetermined time has passed after the vehicle information recording apparatus detected the occurrence of the problem, and the problem information to the information processing apparatus, the information processing apparatus storing, for each vehicle, identification information about the vehicle and shop information in association with each other;

the information processing apparatus receiving the data and time information sent from the vehicle information recording apparatus;

the information processing apparatus storing the received data and time information for each vehicle;

the information processing apparatus determining, based on the data and time information stored for each vehicle, whether or not a vehicle needs maintenance by comparing the data indicating condition of the vehicle at respective time points, or a change in the data with time, with predetermined abnormality condition;

the information processing apparatus, when determined that one vehicle needs maintenance, specifying shop information from the identification information about the one vehicle; and the information processing apparatus reporting the need of maintenance for the one vehicle to the terminal device located in the shop indicated by the shop information.

* * * * *